United States Patent
Andersson et al.

(10) Patent No.: US 10,542,566 B2
(45) Date of Patent: Jan. 21, 2020

(54) CLEAR CHANNEL ASSESSMENT TECHNIQUE

(71) Applicant: Telefonaktiebolaget LM Ericsson (publ), Stockholm (SE)

(72) Inventors: Håkan Andersson, Linköping (SE); Ashim Biswas, Sollentuna (SE); Daniel Figueiredo, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/072,796

(22) PCT Filed: Jan. 27, 2017

(86) PCT No.: PCT/EP2017/051781
§ 371 (c)(1),
(2) Date: Jul. 25, 2018

(87) PCT Pub. No.: WO2017/129751
PCT Pub. Date: Aug. 3, 2017

(65) Prior Publication Data
US 2018/0368183 A1    Dec. 20, 2018

Related U.S. Application Data

(60) Provisional application No. 62/288,504, filed on Jan. 29, 2016.

(51) Int. Cl.
*H04W 74/08*   (2009.01)
*H04W 16/14*   (2009.01)
(Continued)

(52) U.S. Cl.
CPC ....... *H04W 74/0808* (2013.01); *H04W 16/14* (2013.01); *H04W 24/10* (2013.01); *H04W 72/0486* (2013.01)

(58) Field of Classification Search
None
See application file for complete search history.

(56) References Cited

U.S. PATENT DOCUMENTS 7,570,656 B2 *   8/2009   Raphaeli ............... H04B 3/542
                                                        370/445
2006/0280151 A1 * 12/2006   Sawada ............. H04W 72/1252
                                                        370/338
(Continued)

OTHER PUBLICATIONS

ETSI. "Broadband Radio Access Networks (BRAN); 5 GHz high performance RLAN; Harmonized EN covering the essential requirements of article 3.2 of the R&TTE Directive"; Jul. 2014; pp. 1-95; Draft ETSI EN 301 893 V1.7.2; Sophia Antipolis Cedex, France.
(Continued)

*Primary Examiner* — Anh Vu H Ly
(74) *Attorney, Agent, or Firm* — Sage Patent Group

(57) ABSTRACT

A technique for performing a clear channel assessment (CCA) in an unlicensed radio frequency (RF) spectrum is described. The CCA is performed for transmitting data (420) according to a first radio access technology (RAT) in coexistence with a second RAT. As to a method aspect of the technique, signals (411) are received in the unlicensed RF spectrum. The received signals (411) are processed according to an operating state. The processing in a first operating state (402) causes a first delay that is greater than a second delay caused by the processing in a second operating state (404). The operating state depends on the presence of data (420) to be transmitted according to the first RAT in the unlicensed RF spectrum. The CCA is performed based on the processed signals.

22 Claims, 7 Drawing Sheets

(51) Int. Cl.
*H04W 24/10* (2009.01)
*H04W 72/04* (2009.01)

(56) References Cited

U.S. PATENT DOCUMENTS

| | | | |
|---|---|---|---|
| 2012/0257585 A1* | 10/2012 | Sydor | H04W 72/082 370/329 |
| 2013/0316660 A1* | 11/2013 | Hsin | H04W 74/0808 455/73 |
| 2015/0099525 A1 | 4/2015 | Ji et al. | |
| 2017/0251497 A1* | 8/2017 | Larsson | H04W 74/0816 370/328 |
| 2017/0359850 A1* | 12/2017 | Loehr | H04W 76/28 370/328 |
| 2018/0019836 A1* | 1/2018 | Kim | H04J 11/0079 370/328 |
| 2018/0110090 A1* | 4/2018 | Um | H04W 16/14 370/328 |
| 2018/0206186 A1* | 7/2018 | Itagaki | H04W 16/14 370/328 |
| 2018/0255579 A1* | 9/2018 | Shimomura | H04W 74/0808 370/328 |
| 2018/0270860 A1* | 9/2018 | Bhorkar | H04W 72/0406 370/328 |

OTHER PUBLICATIONS

Intel et al. "WF on Initial CCA"; 3GPP TSG-RAN WG1 Meeting #81; Fukuaka, Japan; May 25-29, 2015; pp. 1-5; R1-153664.

* cited by examiner

CLEAR CHANNEL ASSESSMENT TECHNIQUE

TECHNICAL FIELD

The present disclosure generally relates to a technique for performing a clear channel assessment (CCA) in a shared radio frequency spectrum. More specifically, and without limitation, a method and a device are provided for performing the CCA in unlicensed spectrum for a radio access technology (RAT) in coexistence with another RAT.

BACKGROUND

To meet the demand for continuously increasing data rates in wireless communication, radio frequency spectrum and spectral efficiency are increased. For example, areal spectral efficiency has to be increased as the density of wirelessly connected devices increases, which includes both user devices and autonomous devices.

3GPP Long Term Evolution (LTE) has been developed for spectral efficiency. Its initial deployment was limited to licensed spectrum. One of the main work items for Release 13 and future releases of LTE is License-Assisted Access (LTE-LAA), which additionally uses unlicensed spectrum (e.g., at 2.4 GHz and 5.1 GHz) for LTE or LTE-like transmission in coexistence with other wireless standards such as a Wireless Local Area Network (WLAN or Wi-Fi) according to IEEE 802.11 or Bluetooth according to IEEE 802.15.1. In LTE-LAA, a primary component carrier in the licensed spectrum provides a main connection, inter aka for control signaling, while one or more secondary component carriers are set up in the unlicensed spectrum to boost data throughput in a best-effort fashion.

While LTE achieves cell densification and delivers services with predictable quality and highest spectral efficiency, most of the available unlicensed frequency bands are used by multiple WLANs with unpredictable spatial and temporal granularity. A multitude of frequency bands is available in the unlicensed spectrum, for example starting at 5 GHz, which can be used for LTE transmission, if a suitable coexistence protocol is used. Collisions in the unlicensed spectrum between the two radio access technologies would significantly reduce the performance of both LTE and WLAN, if no coexistence measures were taken.

Furthermore, standalone LTE in the unlicensed spectrum (i.e., LTE operation without assistance in the licensed spectrum) is discussed for 3GPP LTE Release 14 and beyond as LTE-Unlicensed (LTE-U), and further as "Multefire" at the Multefire Alliance.

In each of above exemplary scenarios, at least one LTE carrier in the unlicensed spectrum shares its radio frequency spectrum with another RAT, e.g., WLAN, Bluetooth and/or an LTE carrier component of another operator. However, a transceiver adapted to perform scheduled operations within a rigid frame structure, such as an LTE transceiver, is not necessarily optimized for performing unscheduled coexistence measures.

SUMMARY

Accordingly, there is a need for a technique that allows performing coexistence measures, by a device adapted to perform a certain radio access technology, to detect another radio access technology.

As to one aspect, a method of performing a clear channel assessment (CCA) in an unlicensed radio frequency (RF) spectrum for transmitting data according to a first radio access technology (RAT) in coexistence with a second RAT is provided. The method comprises or triggers a step of receiving signals in the unlicensed RF spectrum; a step of processing the received signals according to an operating state, wherein the processing in a first operating state causes a first delay that is greater than a second delay caused by the processing in a second operating state, the operating state depending on the presence of data to be transmitted according to the first RAT in the unlicensed RF spectrum; and a step of performing the CCA based on the processed signals.

The technique can be embodied to process the received signals in the second operating state, which is less time-consuming than the signal processing in the first operating state, so that the first RAT can contend for the unlicensed RF spectrum equitably with the second RAT when data is to be transmitted in the unlicensed RF spectrum by the first RAT.

At least some embodiments can achieve an unbiased and efficient usage of the unlicensed spectrum by both the first RAT and the second RAT. A duty cycle of transmissions on the unlicensed RF spectrum can be increased. A fraction of transmissions lost due to collisions can be minimized.

The first RAT may be a scheduled and/or synchronous RAT. E.g., the first RAT may transmit according to a frame structure. For accessing a base station of the first RAT, a cell synchronization may be required. The second RAT may be an unscheduled and/or asynchronous RAT. E.g., the second RAT may allow unscheduled (e.g., intermittent) transmissions. A base station and a wireless device of the second RAT may communicate without synchronization or without a frame structure common to both the base station and the wireless device.

The second RAT may be asynchronous relative to the first RAT. Transmissions of the second RAT may be unaligned, or temporally uncorrelated, with the frame structure of the first RAT.

The first RAT may be a cellular RAT. The first RAT may include 3GPP Long Term Evolution (LTE). E.g., the first RAT may include at least one of LTE License-Assisted Access (LTE-LAA), LTE-Unlicensed (LTE-U) and Multefire" according to the Multefire Alliance.

The second RAT may be different from the first RAT. E.g., the second RAT may be a RAT implementation that is not operated synchronously with the first RAT. Alternatively or in addition, the second RAT may be technically incompatible with the first RAT. The technique may avoid or minimize inter-RAT collisions. The second RAT may be a non-cellular RAT and/or a RAT that does not allow for handovers between access points. The second RAT may be implemented by a Wireless Local Area Network (WLAN) or Wi-Fi network according to the standard family IEEE 802.11.

A first signal path used in the first operating state for the processing of the received signal may be different from a second signal path used in the second operating state. E.g., the first signal path used in the first operating state may include a signal-conditioning unit. The signal-conditioning unit may be not included in the second signal path.

A portion of the first and second signal paths, e.g., at least one processing unit, may be used in both the first operating state and the second operating state. At least a first processing unit between a receiving antenna and the signal conditioning unit may be applied in both the first operating state and the second operating state.

Alternatively or in addition, at least a second processing unit between the signal conditioning unit and a decoder may be applied in both the first operating state and the second operating state.

The first signal path and/or the first delay may be compatible with, or optimized for, signal processing according to the first RAT, e.g., for reliably receiving data using the first RAT. The second signal path and/or the second delay may be compatible with, or optimized for, signal processing according to the second RAT and/or for performing the CCA in the unlicensed RF spectrum to rapidly detect a transmission of the second RAT or to rapidly determine the absence of such a transmission.

The CCA may be a functionality of a listen-before-talk (LBT) radio access mechanism. The LBT radio access mechanism may include a CCA mechanism performing the CCA and/or a back-off mechanism postponing the transmission of the data by a back-off time. The back-off time may be derived from a pseudo-random number. The term LBT, as used herein, may encompass any probabilistic media access control protocol, e.g., Carrier Sense Multiple Access (CSMA). More specifically, the term LBT may encompass CSMA with collision detection (CSMA/CD) and/or CSMA with collision avoidance (CSMA/CA). The method may improve the LBT radio access mechanism for LTE in shared spectrum.

The first operating state may also be referred to as an LBT passive state. The LBT passive state may include performing the CCA without subsequently performing the back-off mechanism and/or without a subsequent data transmission.

The second operating state may also be referred to as an LBT active state. The LBT active state may include performing the CCA and the back-off mechanism, e.g., followed by the data transmission if clearance is indicated by the CCA.

By changing between the first and second operating states depending on the presence of the data to be transmitted, a prioritization mechanism may be implemented. The prioritization mechanism may determine the operating state to minimize the impact of the processing delay (that may also be referred to as a receive-chain delay) to the LBT radio access mechanism. The prioritization mechanism may introduce additional control signals emanating from states in an already existing state machine (e.g., including the first and second operating states). These signals may determine whether or not the delay-causing signal processing, such as AGC and filtering, is engaged.

When faithful reception is prioritized, such as for data reception according to the first RAT or when channel-occupancy statistics is gathered, the first delay in the first operating mode may be tolerated. When LBT is performed for the purpose of grabbing a channel in the unlicensed RF spectrum for transmitting the data according to the first RAT, a delay in the CCA decision is reduced or minimized due to the second delay in the second operating state. The second operating state may bypass the delay-causing signal processing.

The operating state may be maintained in the first operating state or switched to the first operating state, if data to be transmitted is not present. Alternatively or in addition, the operating state may be switched to the second operating state in response to the presence of data to be transmitted. When the received signals include data to be received (receive data) and the data to be transmitted (transmit data) is present, the operating state may be switched to the second operating state as soon as the reception of the receive data or a frame of the first RAT is completed.

One or more transmit buffers (or queues) may store data before the data is transmitted over the unlicensed RF spectrum. The one or more buffers may be operated according to a Packet Data Convergence Protocol (PDCP). The PDCP may define multiple bearers and one buffer for each of the bearers. The presence of the data to be transmitted may depend on a status (e.g., a filling level) of the one or more transmit buffers.

In the first operating state, the signal-conditioning unit may process the received signals. The received signals may bypass the signal-conditioning unit in the second operating state. A difference between the first delay and the second delay may correspond to a processing time of the signal-conditioning unit. The signal-conditioning unit may include at least one of an automatic gain control (AGC) and a signal filter.

Performing the CCA may include detecting energy in the unlicensed RF spectrum without demodulating and/or without decoding the received and processed signals, e.g., in the second operating state. Alternatively or in addition, the first operating state may be maintained for processing the received signals, e.g., while the processed signals are to be decoded or if the received signals are expected to be decodable (e.g., based on a reception scheduled for the first RAT). The first operating state may be maintained as long as the processed signals are successfully demodulated and/or decoded. By way of example, the data to be transmitted may include a response to the received signals. Alternatively or in addition, the first operating state may be maintained for processing the received signals while the processed signals are analyzed, e.g., for determining the RAT associated with the received signals (e.g., being the first RAT or the second RAT). A channel-load statistic may be generated based on the analysis.

The method may further comprise or trigger a step of transmitting the data according to the first RAT in the unlicensed RF spectrum after expiry of a back-off time, if a result of the CCA indicates a clear channel. The data may be transmitted according to the first RAT in the unlicensed RF spectrum in a third operating state. No CCA is performed in the unlicensed RF spectrum while in the third operating state.

A receiver of a radio unit (e.g., an antenna amplifier) may be active in the first and the second operating states. A transmitter of the radio unit (e.g., a power amplifier) may be active in the third operating state. The receiver and/or the CCA may be inactive (at least in the unlicensed RF spectrum used by the transmission) in the third operating state.

One or more antennas may be connected or connectable to the radio unit. The signals may be received and/or processed by the radio unit. The radio unit may include the signal-conditioning unit. The radio unit may be coupled to, or integrated within, a baseband unit. The baseband unit may also be referred to as a digital unit. The baseband unit may perform the CCA based on the processed signals.

The baseband unit may determine the operating state. The baseband unit may include a scheduler that determines the operating state. The baseband unit may include the one or more transmit buffers. The baseband unit may control the radio unit to process the received signals according to the operating state. The baseband unit may be configured to control the radio unit to enable and bypass the signal-conditioning unit according to the first operating state and the second operating state, respectively. The baseband unit may be configured to at least one of demodulate the processed signals and decode the demodulated signals, e.g., in the first operating state.

The method may be performed by a base station (e.g., an LTE eNodeB or eNB). The base station may be a component of a radio access network. The base station may include one or more transmit buffers for storing downlink data. Alternatively or in addition, the method may be performed by a user equipment (UE). The UE may include one or more transmit buffers for storing uplink data. The term UE may encompass any device configured to wirelessly communicate according to the first RAT, e.g., any device configured to access the base station and/or the radio access network. The UE may be a user terminal or a machine-type device. Alternatively or in addition, the UE may be a mobile (or portable) device or a stationary device.

The base station may provide radio access in a first cell according to the first RAT. The first cell may be a "small cell" as a technical means for radio access that locally increases radio network capacity. The small cell may transmit signals according to the first RAT with less power and/or may have a smaller coverage radius as compared to a macro cell. A transmission power of the macro cell may be in the range from 20 W to 40 W. The data may be transmitted according to the first RAT in the unlicensed spectrum with a transmission power in the range from 20 mW to 2 W.

The "small cell" may be a femto cell, a nano cell, a micro cell, a pico cell or a metro cell. In an LTE-LAA implementation, Carrier Aggregation (CA) may be used to operate the first cell in the unlicensed spectrum in conjunction with a second cell in a licensed spectrum. Coverage areas of the first and second cells may (e.g., partially) overlap. The second cell may be another small cell or a macro cell.

At least a part of the RF spectrum used by the first RAT may be unlicensed. The unlicensed RF spectrum may be used not exclusively by the first RAT. The unlicensed RF spectrum, or the part of the RF spectrum that is unlicensed, may also be used or accessible by one or more other RATs, e.g., the second RAT. Accessing and/or using the unlicensed RF spectrum may include transmitting and/or receiving signals in the unlicensed RF spectrum.

The first RAT may use both licensed spectrum and unlicensed spectrum, which may also be referred to as License-Assisted Access (LAA). For example, the LAA may be performed according to 3GPP Long Term Evolution (LTE-LAA). Alternatively or in addition, the first RAT may use solely the unlicensed RF spectrum, which may also be referred to as radio access in unlicensed spectrum. For example, the radio access in the unlicensed spectrum may be performed according to LTE (LTE-U) or Multefire.

A processing delay (e.g., the difference between the first delay and the second delay) caused by the signal-conditioning unit in the first operating state may be less than a postponing delay of the transmission (e.g., including the back-off time) in the second operating state between determining that the channel is clear and transmitting the data on the channel.

As to a further aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., the radio access network and/or the Internet.

As to another aspect, a device for performing a clear channel assessment (CCA) in an unlicensed radio frequency (RF) spectrum for transmitting data according to a first radio access technology (RAT) in coexistence with a second RAT is provided. The device may be configured to perform or trigger any one of the steps of the method aspect. Alternatively or in addition, the device may be coupled to an antenna and may comprise a signal reception module for receiving signals in the unlicensed RF spectrum; a signal process module for processing the received signals according to an operating state, wherein the processing in a first operating state causes a first delay that is greater than a second delay caused by the processing in a second operating state, the operating state depending on the presence of data to be transmitted according to the first RAT in the unlicensed RF spectrum; and a CCA module for performing the CCA based on the processed signals.

As to a still further aspect, a user equipment (UE) wirelessly connected or connectable with a radio access network is provided. The UE comprises the device. The UE may also be referred to as a mobile station.

As to a still further aspect, a base station for cellular radio access is provided. The base station comprises the device. The base station may also be referred to as an access point.

Each of the devices, the UE and the base station may further include any feature disclosed in the context of the method aspects. Particularly, any one of the modules, or a dedicated module or unit, may be configured to perform one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for Long Term Evolution (LTE) implementations such as LTE-LAA and LTE-U, it is readily apparent that the technique described herein may also be implemented in any other wireless communication network, including a Wireless Local Area Network (WLAN) according to the standard family IEEE 802.11 (e.g., IEEE 802.11a, g, n or ac) and/or a Worldwide Interoperability for Microwave Access (WiMAX) according to the standard family IEEE 802.16.

Moreover, those skilled in the art will appreciate that the services, functions, steps and modules explained herein may be implemented using software functioning in conjunction with a programmed microprocessor, an Application-Specific Integrated Circuit (ASIC), a Field-Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the services, functions, steps and implement the modules disclosed herein.

Figure 1:
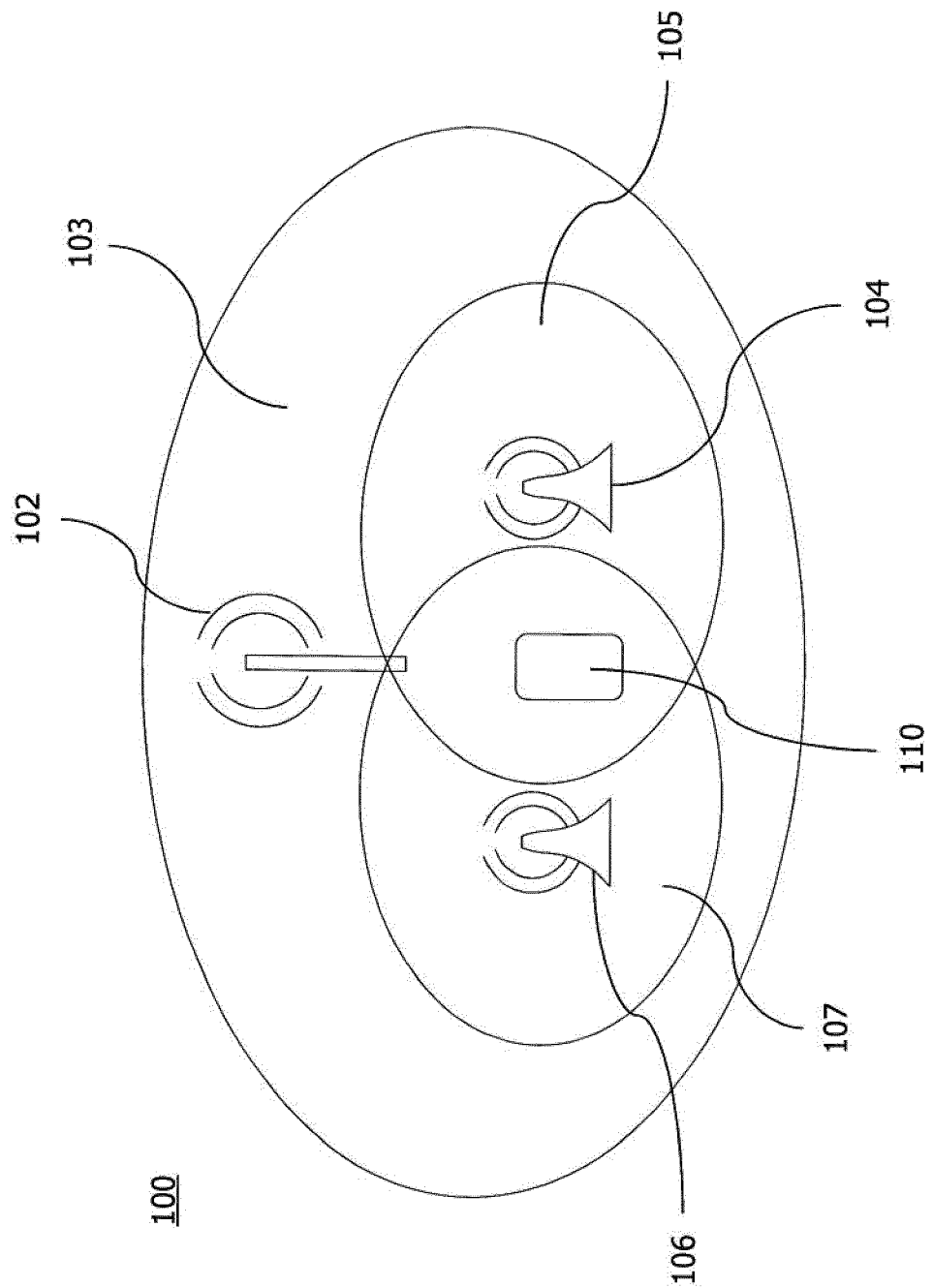
FIG. 1 schematically illustrates an exemplary network environment.

FIG. 1 schematically illustrates a radio access network (RAN) 100 as an exemplary environment for implementing the technique. The RAN 100 may be a heterogeneous network in that the RAN 100 includes a base station 102 providing radio access in a macrocell 103 according to a first radio access technology (RAT) and a base station 104 providing radio access according to the first RAT in a microcell 105.

At least one of the base stations 102 and 104 provides radio access to a user equipment 110. By way of example, the first RAT implements Long Term Evolution (LTE). The base stations 102 and 104 (also referred to as eNBs) are coordinated using LTE carrier aggregation.

At least one of the base stations in the network 100 uses unlicensed RF spectrum. In the exemplary network environment of FIG. 1, the base station 104 transmits and receives according to LTE in unlicensed RF spectrum. Licensed RF spectrum is generally used by the base station 102 in the macrocell 103.

The heterogeneity and number of base stations 102 and 104 in the network 100 is not limiting. Alternative network embodiments may comprise one base station or more than two base stations. Furthermore, one or more of the base stations in the network 100 may provide LTE radio access using both licensed spectrum and unlicensed spectrum. E.g., the base station 102 and 104 may be collocated.

A radio unit and a baseband unit controlling the radio unit are collective referred to as a system, which may be implemented in each of the base station and/or the UE. RF transmission of data is tightly controlled by a serving LTE base station (e.g., the base station 102 or 104) for both the base station itself and the UE 110. Hence, in the LTE network 100, each system knows in advance when to switch from transmitting to receiving, or vice versa, e.g., if the LTE network 100 implements a time-division duplex (TDD) mode of operation. This is particularly suitable for the licensed RF spectrum, as the transmitter and receiver chains in the radio unit can be prepared in advance. Thus, the RF signals are received with high fidelity by minimizing radio-related disturbances due to switching from transmit mode to receive mode.

An access point 106 provides radio access also using the unlicensed spectrum in a coverage area 107 that overlaps with the microcell 105. The access point transmits, e.g. intermittently and/or at certain times, according to a second RAT. Hence, the first RAT and the second RAT coexist in the unlicensed RF spectrum, e.g., in the overlap of the microcell 105 and the coverage area 107.

From the perspective of a device, e.g., the base station 104 and/or the UE 110, that uses (or prepares to use) the unlicensed spectrum for a transmission according to the first RAT (e.g., an LTE transmission), the coexistence with the second RAT means that the occurrence of energy in the unlicensed spectrum is unpredictable. Coexistence of first and second RATs in the unlicensed spectrum, as used herein, may encompass the coexistence with any second RAT that is, e.g., not synchronized with the first RAT. As one example, the second RAT may also implement LTE (e.g., by another network operator) operated independently from the LTE implementation provided by the first RAT.

As another example, the second RAT may implement WLAN (also referred to as Wi-Fi). WLAN is an asynchronous RAT as such, as opposed to LTE being a synchronous RAT. WLAN transmissions can happen at any time if the channel is free. Moreover, the transmissions have variable sizes, which are signaled in a preamble of a WLAN frame. In contrast, LTE transmissions follow a rigid frame structure and are required to be aligned to a Transmission Time Interval (TTI) of 1 ms. Both transmitter and receiver are aligned to the TTI. The duration of transmissions is in quanta of the TTI. The grant of a downlink or uplink transmission or reception is pre-signaled via control signaling a number of TTIs earlier for each subframe. A scheduling does not encompass multiple subframes.

An important feature of LTE-LAA, and nonexistent in WLAN, is the possibility to use a primary carrier in the licensed RF spectrum, e.g., provided by the base station 102 in the macrocell 103, as a control channel for signaling grants, ACK/NACKs, etc. The data transmission uses, partially or completely, a secondary carrier in the unlicensed RF spectrum, if the second carrier is free. LTE-LAA thus allows serving more users on the licensed RF spectrum, which may benefit from reduced latency and/or fewer link drops. For data transmission on the secondary carrier, the criterion for usage is that the medium is free from other users and/or interference.

Such a conditional transmission is generically referred to as employing listen-before-talk (LBT). License-assisted access (LAA) to unlicensed spectrum has been studied in document 3GPP TR 36.889, V13.0.0, which includes a summary of functionalities for LTE-LAA and LBT in Sect. 7.1.

LBT is a protocol specifying that the wireless medium or RF carrier (i.e., a channel for the potential data transmission) in the unlicensed spectrum is first sensed for any potentially interfering transmissions, which is generically referred to as a clear channel assessment (CCA). If the channel is found to be free, the transmitter can start using the channel. Together with a back-off mechanism, the LBT protocol potentially avoids collisions.

An example for the LBT protocol includes load-based equipment (LBE) described in document ETSI EN 301 893. As another example, the IEEE 802.11 standard specifies a Medium Access Control (MAC) layer including a distributed coordination function (DCF) for sharing the channel. The DCF relies on carrier sense multiple access with collision avoidance (CSMA/CA) according to IEEE 802.11-2012, Sect. 9.3.

An implementation of the LBT protocol may include a step of performing CCA, i.e. listening to the channel, measuring a received signal and deciding whether the channel is busy or free based on energy detection and/or decoding of the received signal. The LBT protocol may further include a step of starting a transmission, if the channel is free, optionally postponing the transmission until a defined back-off time has expired. The LBT protocol will be part of the 3GPP standard for LTE-LAA, e.g., to comply with regulations in the European Union and Japan.

An LTE radio receiver usually has elaborate signal-conditioning modules to further enhance signal quality before processing in the baseband unit. These modules enhance signal quality but may also introduce a delay in the signal processing in the order of 10 μs to 20 μs.

To prevent that the time-critical detection of an unpredictable signal in the CCA is delayed by the LTE radio receiver, a device 200 for performing CCA in unlicensed RF spectrum is implemented in the base station 104 and/or the UE 110.

Figures 2, 3:
FIG. 2 shows a schematic block diagram of a device embodiment for performing a clear channel assessment in the network of FIG. 1.
FIG. 3 shows a flowchart of a method embodiment for performing a clear channel assessment implementable by the device of FIG. 2.

As shown by the block diagram in FIG. 2, an embodiment of the device 200 comprises a signal reception module 202, a signal process module 204 and a CCA module 206. The device 200 may be operated according to a method 300 of performing CCA in unlicensed RF spectrum for transmitting data according to a first RAT in coexistence with a second RAT. FIG. 3 shows a flowchart of an implementation of the method 300.

In a step 302 performed by the module 202, RF signals are received on a channel intended for the data transmission in the unlicensed spectrum. The received signals are processed by the module 204 in a step 304 depending on a current operating state of the device 200. When the device 200 is in a first operating state, the signal processing causes a first delay that is greater than a second delay caused by the signal processing when the device 200 is in a second operating state. The operating state is changed depending on whether or not data ready for transmission is available at the device 200. The module 206 performs the CCA based on the signals processed according to the current operating state in a step 306 of the method 300.

In an implementation, the method 300 differentiates a radio receiver chain (which is part of a signal-processing path in the system) in two operating states that influence an LBT mechanism. In the first operating state, the delay caused by the signal process module 204 is critical for the LBT mechanism. In the second operating state, signal enhancement brought about by the signal process module 204 is of prime importance. A time-critical response of the CCA underlying the LBT mechanism and high signal quality for data reception are contradictory requirements for a conventional system, so that the radio receiver chain in conventional systems compromises the two requirements. The technique can be implemented to decouple the two requirements, so that each requirement can be optimized separately in the respective operating state of the device 200.

An embodiment of the device 200 bypasses one or more signal-conditioning modules in the second operating state. As a result, the processing delay is minimized (e.g., leading to the second delay) when fast CCA-decisions are required. The signal processing 304 in the second operating state may correspond to signal processing of a receiver chain optimized for CCA according to the second RAT.

In the first operating state, the processing delay (e.g., included in the first delay) is tolerated, so that the signal quality is not compromised. The signal processing 304 in the first operating state may correspond to signal processing of a receiver chain optimized for data reception according to the first RAT.

Based on the method 300, an LBT mechanism with fast reaction time can be implemented, which minimizes the probability of collisions on the channel in the unlicensed RF spectrum, while still maintaining the advantages of signal-enhanced processing in the radio receiver chain when the RF communication according to the first RAT is less delay-sensitive.

The unlicensed RF spectrum may include one or more unlicensed RF bands. For example, the unlicensed RF spectrum may include, partially or completely, the industrial, scientific and medical (ISM) radio bands. Alternatively or in addition, the unlicensed RF spectrum may include, partially or completely, RF bands within frequency limits from 2412 MHz or 2422 MHz to 2462 MHz or 2484 MHz. Alternatively or in addition, the unlicensed RF spectrum may include, partially or completely, RF bands within frequency limits from 5150 MHz to 5925 MHz. More specifically, the unlicensed spectrum may include RF bands within frequency limits from at least one of 5150 MHz to 5350 MHz, 5470 MHz to 5725 MHz and 5725 MHz to 5875 MHz.

The unlicensed spectrum can be used to provide mobile broadband access (e.g., personalized television), massive machine-type communication (MTC, e.g., transportation monitoring and control) or critical machine-type communication (e.g., remote operation with defined bandwidth and latency demands on the network 100).

Figure 4:
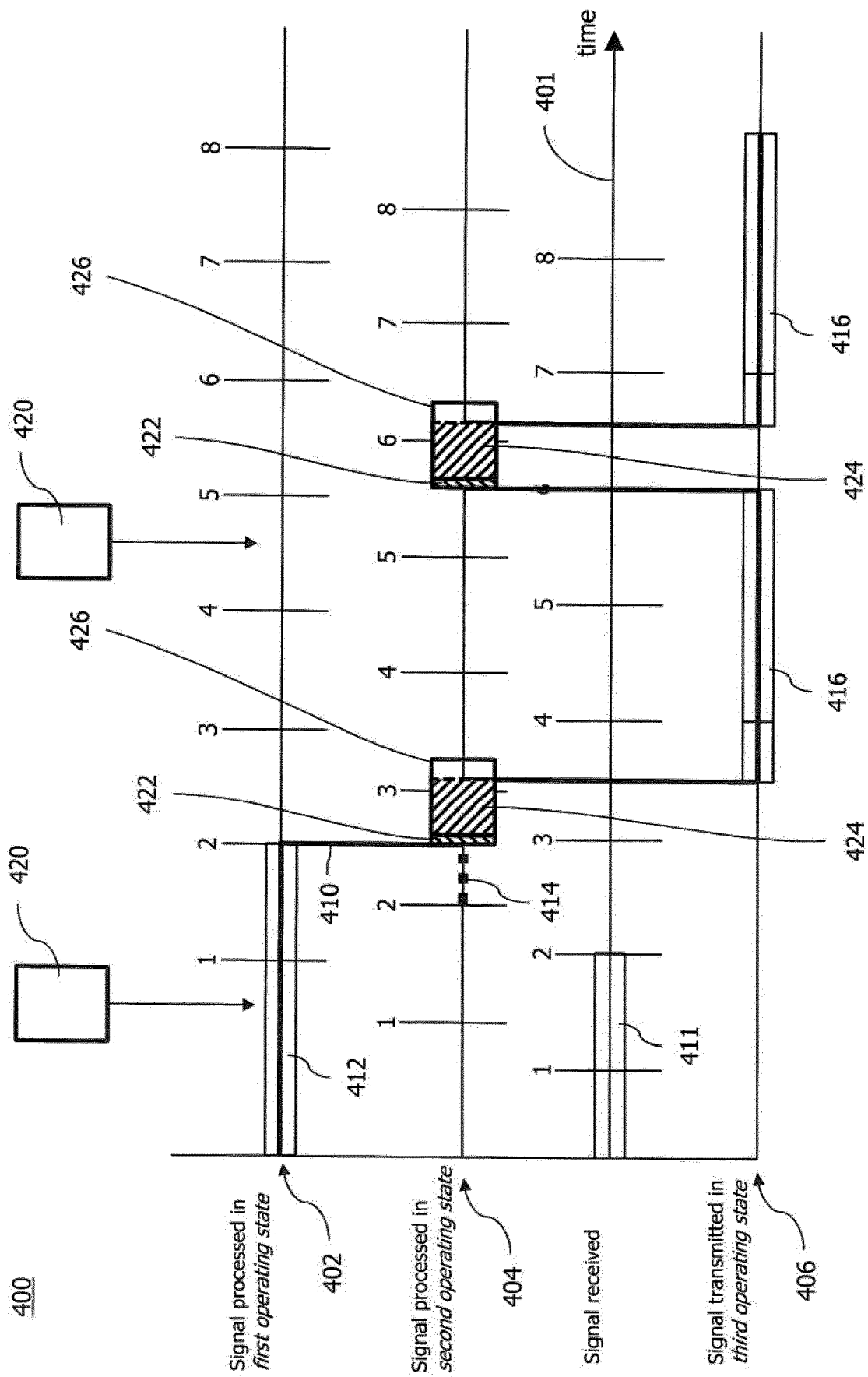
FIG. 4 shows a first example sequence of operating states assumed by the device of FIG. 2 performing the method of FIG. 3.

FIG. 4 schematically illustrates a first example of a sequence 400 of changing operating states of the device 200. A time axis 401 includes time units of the first RAT, e.g., frames or subframes of the first RAT, which are schematically illustrated by consecutively numbered vertical lines crossing the time axis 401.

The first and second operating states are indicated by horizontal lines at reference signs 402 and 404, respectively. A third operating state for the conditional transmission of data is indicated at reference sign 406. A thick horizontal line indicates the current operating state. A thick vertical line 410 indicates a transition between the operating states.

Received signals (at the time of reception at the antenna), processed signals (with the first delay in the first operating state) and transmitted signals are indicated by boxes 411, 412 and 416 on the corresponding horizontal lines 401, 402 and 406, respectively.

In the second operating state 404, the processed signals are less delayed as compared to the first operating state 402, which is indicated by consecutively numbered labels shifted to the right relative to the time axis 401 according to the first and second delays, respectively. In both, the first operating state 402 and the second operating state 404, the processed signals are input to the CCA according to the step 306.

The device 200 receives the data 411 via the first RAT, resulting in data 412 processed according to the first operating state 402. While data is received and processed, data 420 to be transmitted becomes available at a point in time indicated by a vertical arrow. In response to the presence of the transmission data 420, the device 200 switches to the second operating state 404 as soon as the received and processed data 412 is complete (e.g., after completely handing over the data 412 to the baseband unit). Completion may be determined by decoding the data 412 according to the first RAT.

Since the transition 410 from the first operating state 402 to the second operating state 404 occurs not until signal reception (in the step 302) and the associated signal processing (in the step 304) is completed, there is no loss of received signals for the first RAT that would correspond to processed signals 414 in second operating state 404.

The CCA is performed according to the step 306 based on the signals processed according to the second operating state 404 in the step 304. If the channel remains clear (which is also referred to as idle) during a Distributed Inter-Frame Spacing (DIFS) time 422, the device 200 determines a random waiting time 424 (which is also referred to as the back-off time) within a back-off window 426. That is, the transmission 416 is postponed (or deferred) by the DIFS 422 and the back-off time. 424.

The transmission starts by switching to the third state 406 as soon as the back-off time has expired. The back-off time is reduced as long as the CCA indicates that the channel is free. Potentially, another device (e.g., in another base station or another UE) occupies the channel, e.g., due to a shorter back-off time determined by the other device. As long as the CCA indicates that the channel is busy (which is also referred to as occupied), the back-off time is halted. The transmission starts as the back-off time is reduced to zero.

The duration of the DIFS time 422 and the granularity of the back-off time 424 may be defined by the second RAT. For example, the DIFS may be 34 µs for WLAN.

Since the first and second RATs are not synchronized, the transmission time is not necessarily aligned with the frame structure of the first RAT. E.g., the time units for determining and reducing the back-off time according to the second RAT may be less than the time units of the first RAT.

When the device 200 occupies the channel (as indicated between the time units 3 and 4 in FIG. 4), the synchronized LTE transmission starts at the next frame border (as indicated at time unit 4 in FIG. 4).

Alternatively or in addition, the data 420 to be transmitted becomes available at the device 200 while transmitting 416 on the channel. In response to the presence of the further transmission data 420, the device 200 switches to the second operating state 404 as soon as the transmission 416 has been completed and performs the back-off mechanism for the further transmission 416.

Figure 5:
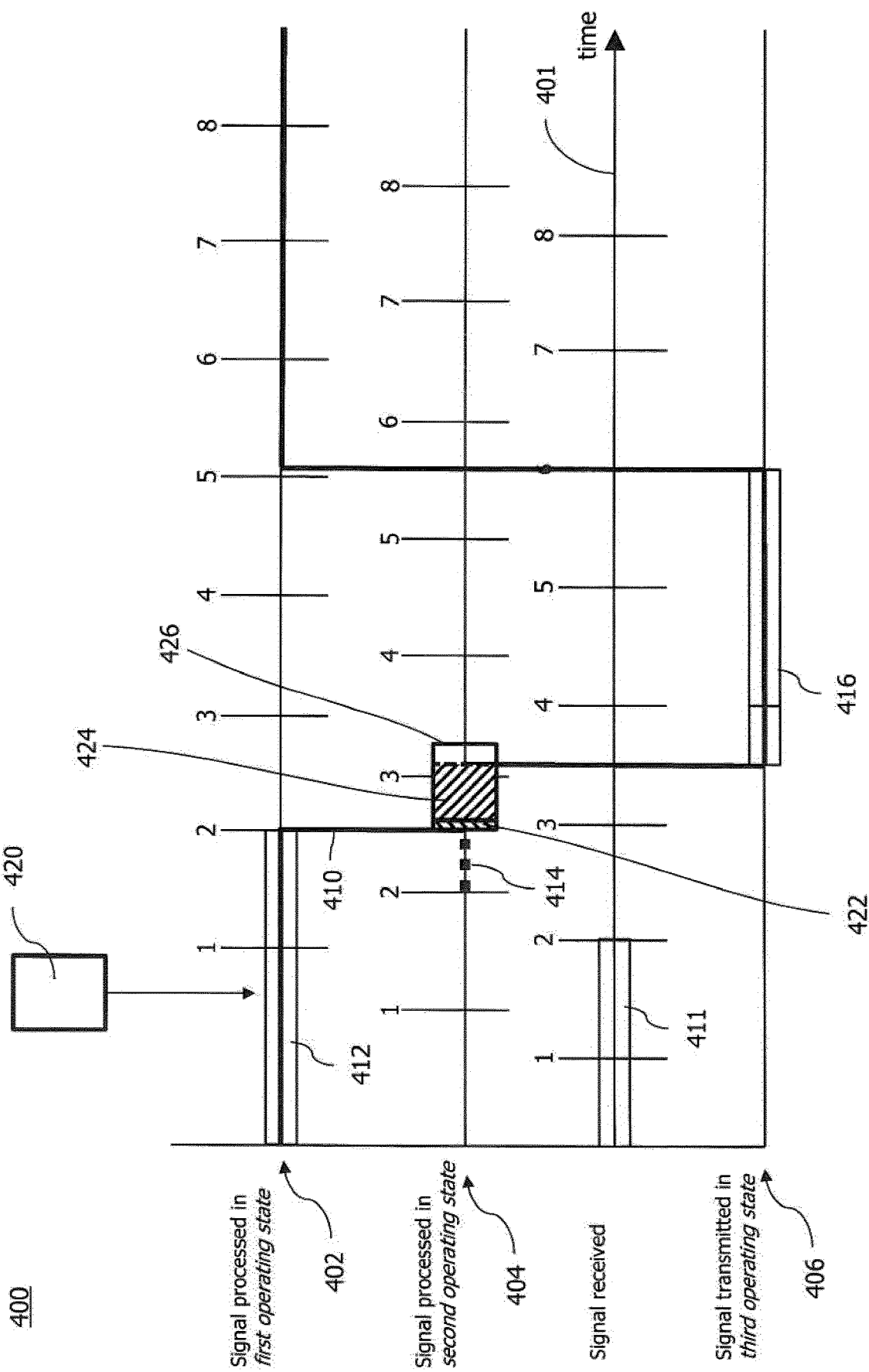
FIG. 5 shows a second example sequence of operating states assumed by the device of FIG. 2 performing the method of FIG. 3.

FIG. 5 schematically illustrates a second example of a sequence 400 of changing operating states of the device 200. Features corresponding to those of the first sequence are indicated by like reference signs.

In the absence of further data to be transmitted, the device 200 switches to the first operating state 402 as soon as the transmission 416 has been completed. This is illustrated at time unit 6 in FIG. 5.

Figure 6:
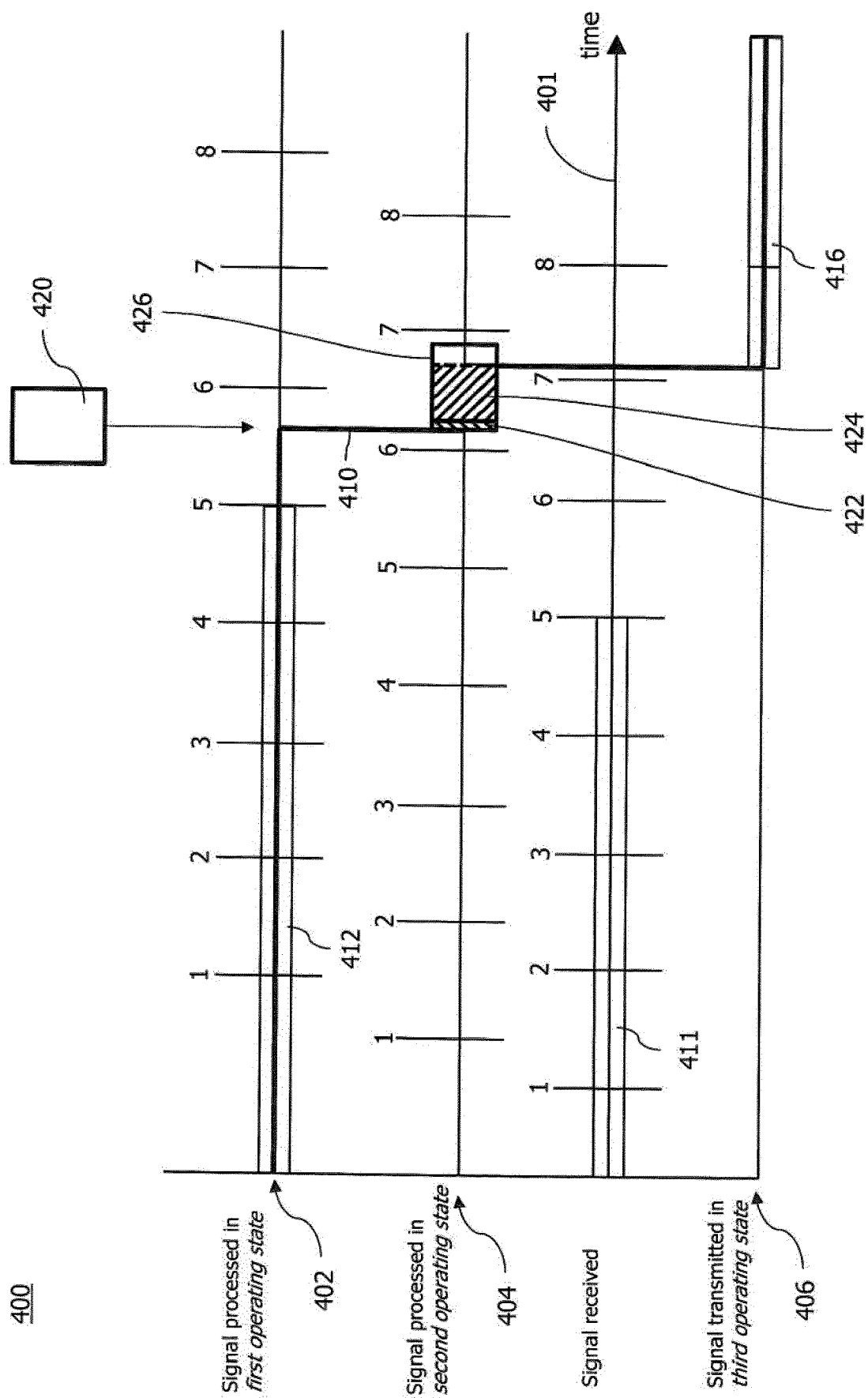
FIG. 6 shows a third example sequence of operating states assumed by the device of FIG. 2 performing the method of FIG. 3.

FIG. 6 schematically illustrates a third example of a sequence 400 of changing operating states of the device 200. Features corresponding to those of the first or second sequence are indicated by like reference signs.

As receiving and processing the data 412 via the first RAT is completed (which is illustrated at time unit 5 in FIG. 6), the device 200 remains in the first operating state 402. The CCA is thus based on the signals processed with the first delay, and any signals received on the channel according to the first RAT are properly received.

As soon as data 420 for transmission becomes available, the device 200 switches to the second operating state 404 and performs the rapid back-off mechanism based on the second delay. This is indicated between time units 6 and 7 for the second state 404 in FIG. 6. The data 420 is transmitted by signals 416 in the third state 406 as the back-off time expires.

Figure 7:
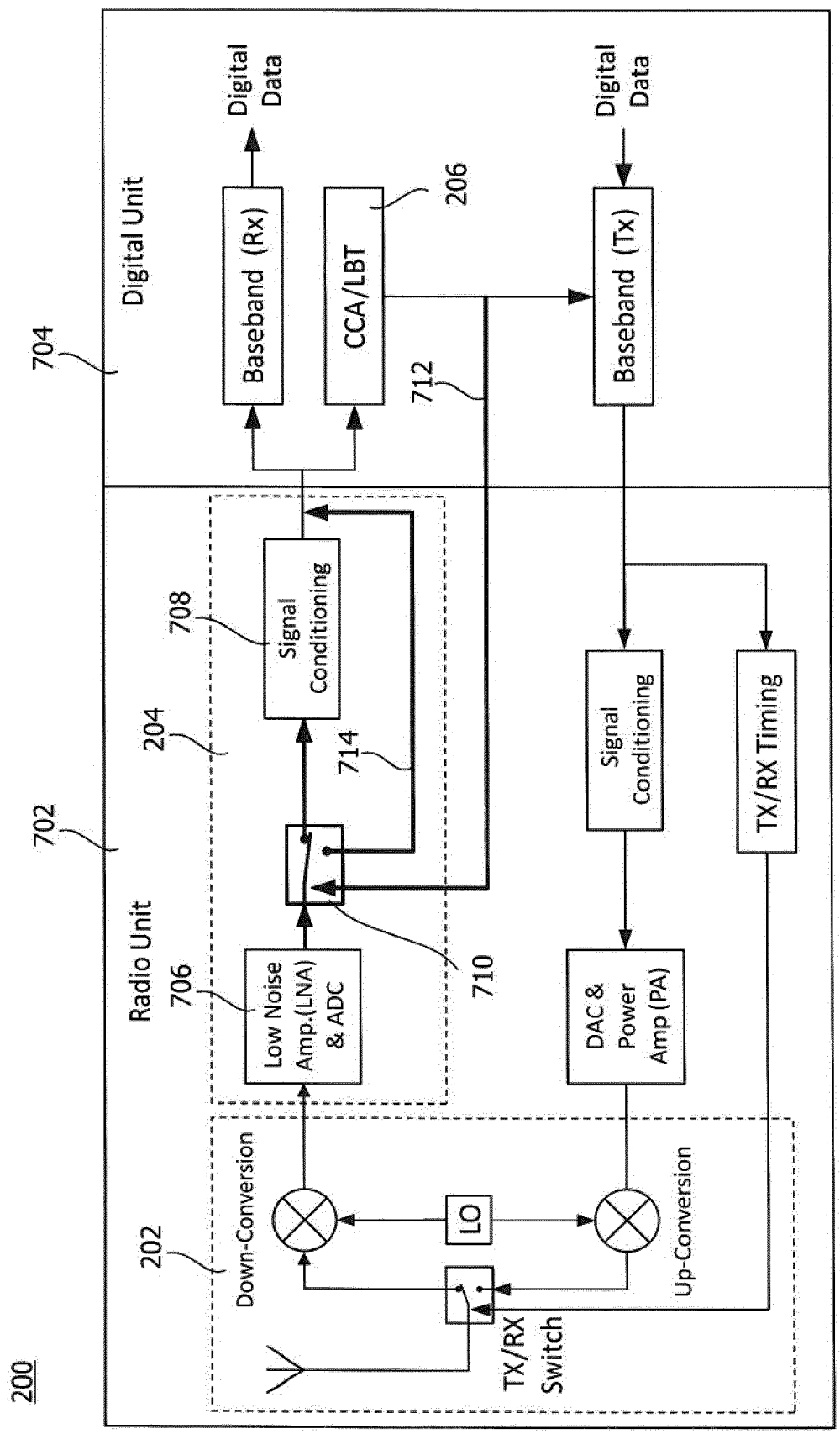
FIG. 7 schematically illustrates further details of an embodiment of the device of FIG. 2.

FIG. 7 shows a schematic block diagram of an embodiment of the device 200. The device 200 may be structurally or functionally divided into an analog domain including the radio unit 702 and a digital domain including the baseband unit 704 (which is also referred to as a digital unit).

The signal reception module 202 includes (or is connected to) the antenna, which is selectively operated in the receive mode (RX) or the transmit mode (TX). The mode may be altered according to a TDD timing of the first RAT.

The radio receiver chain includes the signal process module 204. The signal process module 204 includes at least one of an automatic gain control (AGC) unit 706 and a signal-conditioning unit 708. The domain division in units 702 and 704 is optional. In the embodiment of the device 200 shown in FIG. 7, the unit 706 includes an analog-to-digital converter (ADC) and the unit 708 is implemented in the digital domain.

The CCA module 206 changes the operating state of the signal process module 204 by means of a switch 710 in the signal process module 204. A control line 712 connects the signal process module 204 and the switch 710. The signal process module 204 includes a bypass connection 714 implementable as a data line. In the embodiment shown in FIG. 7, the bypass connection 714 is configured to bypass the signal-conditioning unit 708.

The switch 710 receives signals from the unit 706. The switch 710 outputs the received signals to the signal-conditioning unit 708 in the first operating state. In the second operating state, the switch 710 outputs the received signals via the bypass connection 714 to the baseband unit 704.

In a variant, the switch outputs signals to the baseband unit 704 in both the first and the second operating states, and selectively receives signals from the signal-conditioning unit 708 in the first operating state and from the unit 706 via the bypass connection 714 in the second operating state. The variant allows an uninterrupted operation of the signal-conditioning unit 708 for rapidly switching between the first and second operating states.

The radio unit 702 of the device 200 may implement an LTE transceiver in the first operating state. The signal transmission from the radio unit 702 to the baseband unit 704 does not involve any processing as such and does not incur any considerable processing delay.

The modules or units in the radio receiver chain that introduce the largest contribution to the first delay may include the AGC unit 706 and/or the signal-conditioning unit 708. The AGC unit 706 ensures that an envelope of the amplitude of the received signal is continuously adapted to suit the dynamic range of the subsequent processing chain (e.g., the ADC in the unit 706 and the unit 708).

The signal-conditioning unit 708 implements a multi-stage filtering. The multi-stage filter shapes the desired signal and blocks unwanted disturbances, e.g., according to a time-frequency grid of the first RAT.

The CCA module 206 may also implement the LBT mechanism, e.g., by controlling the transmission (indicated by the vertical arrow) in the third operating state based on a result of the CCA. The CCA module 206 is also referred to as an LBT module.

Implementing the LBT module in the baseband unit 704 (or connecting the LBT module to the baseband unit 704) follows a beneficial LTE-architecture design that keeps the scheduler and control functionality in the baseband unit 704, while the radio unit 702 can be kept simpler (and cheaper). Splitting baseband- and scheduler-processing, on the one hand, and radio signal processing, on the other hand, improves scalability, reliability, control and maintenance of LTE networks 100.

Although the LBT module could be placed in the radio unit 702 close to the antenna to avoid delays, the benefits of integrating the LBT mechanism with the scheduler are substantial in the LTE architecture, e.g., since the scheduler in the baseband unit 704 prepares the data to be transmitted and generates the request to measure the channel for a possibility to transmit. The technique can be implemented to achieve these benefits without impairing the LBT mechanism due to the processing delay.

To explain this advantage, the susceptibility of the LBT mechanism to processing delay is outlined. The LBT mechanism uses CCA decisions to know when the transmitter can be turned on. However, a CCA decision can be erroneous if the over-the-air samples measured by the CCA process are delayed due to prior signal processing in the radio receiver chain.

By way of example, let the processing delay caused by the signal-conditioning unit 708 be denoted by $\Delta$, which is typically about 10 µs. The samples received by the CCA module 206 are delayed by $\Delta$ in the first operating state compared to the second operating state. The total delay of a CCA decision is $\Delta+\tau$, wherein $\tau$ (which is typically about 4 µs) is the further processing delay in the CCA module 206. The delay $\tau$ may be equal to a minimum number of samples (required by the CCA module 206 for taking the decision) divided by a sampling frequency, i.e., the time for collecting the required number of samples.

Thus, the CCA decision is available for the LBT mechanism after $\Delta+\tau$. If the LBT mechanism decides to switch on the transmitter based on a clear channel state indicated by the CCA, the state of the channel may have changed by that time, potentially leading to a collision with the second RAT. The method 300 reduces the processing delay from the first delay to the second delay by $\Delta$, and thus minimizes the risk of collisions and subsequent degrading of overall system performance.

Figure 8:
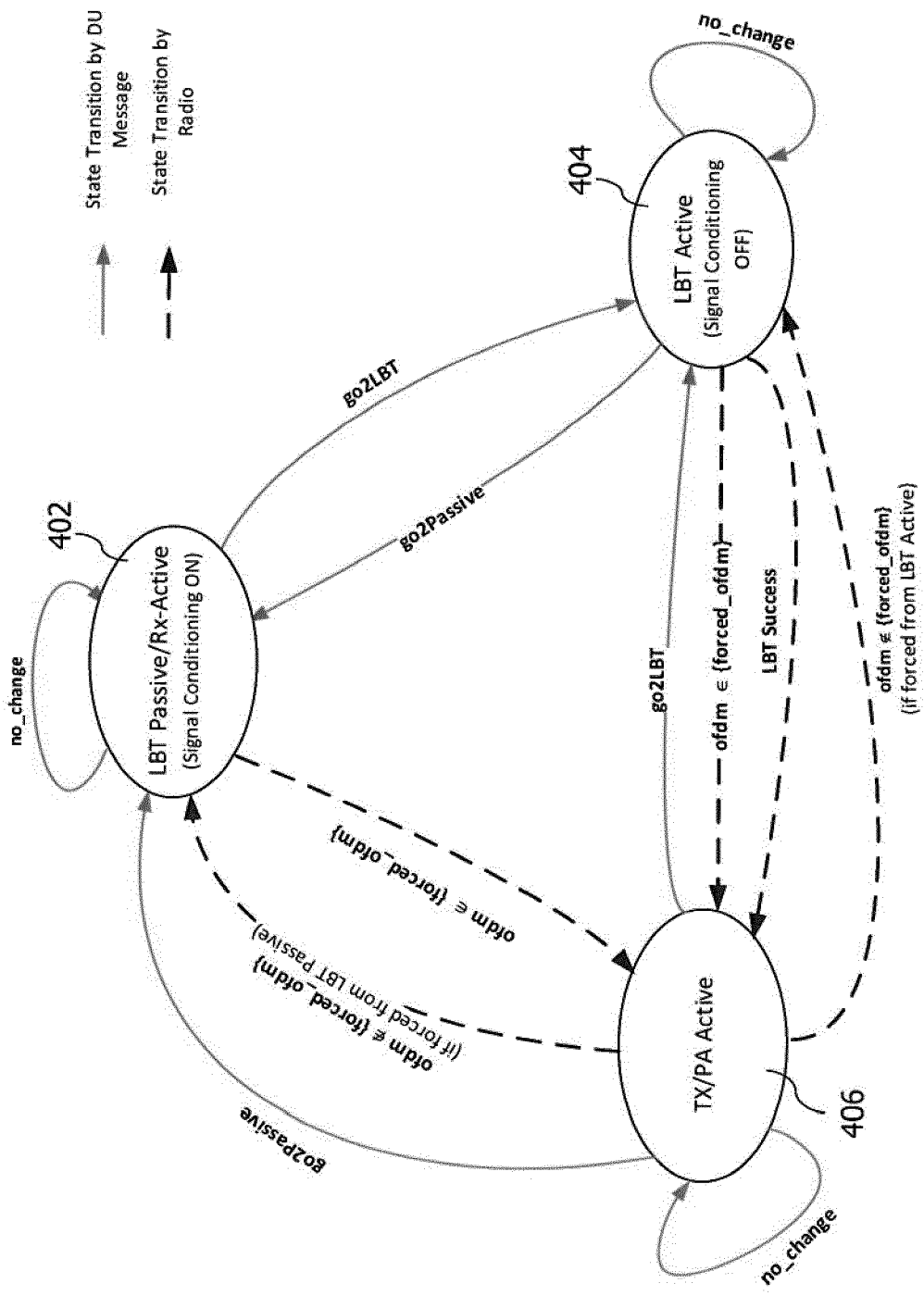
FIG. 8 schematically illustrates a state machine implementable by the device of the device of FIG. 2 or 7.

FIG. 8 schematically illustrates an LBT state machine 800, which may be implemented by the device 200. In the LBT state machine 800, entering the two states "LBT Passive/Rx-Active" corresponding to the first operating state 402 and "LBT Active" corresponding to the second operating state 404 causes a control signaling (output at the control line 712), e.g., in the form of "Signal conditioning ON" and "Signal conditioning OFF", respectively. An existing LBT state machine may be augmented by outputting the control signaling.

The embodiment of an LBT state machine 800 schematically illustrated in FIG. 8 comprises the three operating states 402, 404 and 406. In the "LBT Passive" state 402, the device 200 performs at least one of the following two steps: a first step of receiving and decoding data from participants (e.g., a base station or a UE) of the first RAT; and a second step of listening to the channel for interference from other users of the unlicensed spectrum (e.g., a base station or a UE of the second RAT). The second step may include the CCA. However, if the CCA module 206 detects a free channel, the LBT mechanism does not start transmitting but rather continues listening.

Since there is no need to turn on the transmitter in the first operating state 402, a delayed CCA-decision is not detrimental to the system. The signal-conditioning unit 708 is on (and not bypassed), and the radio unit 702 is receiving signals according to the step 302. Hence, the first operating state 402 implies the Rx mode (also referred to as "Rx-Active") of the signal reception module 202. The baseband unit 704 is optionally decoding the processed signals resulting in received data.

In the "LBT Active" state 404, the device 200 performs a step of listening to the channel for interference or intended transmissions from other users, i.e., signals of the second RAT. The listening step may include the CCA performed according to the step 306, which is delay-critical in second operating state 404. To minimize the duration of the receiver signal processing, all time-delaying signal-conditioning modules (e.g., the unit 708) are bypassed. If the CCA module 206 detects a free channel, it changes the operating state automatically to the third operating state 406 (which is also referred to as "TX/PA Active" by means of the command "LBT Success".

In the "TX/PA Active" state 406, the device 200 transmits the data 420. The power amplifier (PA) is turned on.

The commands for state transitions (shown by solid arrows in FIG. 8) are output from the baseband unit 704 (or digital unit "DU") to the radio unit 702. The state transition commands are triggered every TTI, preferably in synchronization with radio data for a corresponding subframe. Further state transitions (shown by dashed arrows in FIG. 8) are triggered for transmitting or receiving specific OFDM symbols according to the first RAT.

As has become apparent from above description of exemplary embodiments, the technique allows evolved signal processing for communicating according to a first radio access technology in conjunction with rapid clear channel assessments for detecting a second radio access technology.

A processing delay caused by the signal processing, e.g., required when receiving data or gathering channel statistics, can be decoupled from a delay of the clear channel assessment used by a coexistence mechanism such a listen-before-talk mechanism, e.g., for the purpose of grabbing the channel for own data transmission.

The technique can be implemented to prevent that the processing delay used for receive-signal conditioning becomes a trade-off between how well the signal processing can be done (since better filters typically introduce longer delays) and how quickly the clear channel assessment can react when contending for the channel. The technique can be implemented to independently optimize both types of signal reception.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of performing a clear channel assessment (CCA) in an unlicensed radio frequency (RF) spectrum for transmitting data according to a first radio access technology (RAT) in coexistence with a second RAT, the method comprising:
   receiving signals in the unlicensed RF spectrum;
   processing the received signals according to an operating state, wherein the processing in a first operating state causes a first delay that is greater than a second delay caused by the processing in a second operating state, the operating state depending on the presence of data to be transmitted according to the first RAT in the unlicensed RF spectrum; and
   performing the CCA based on the processed signals.

2. The method of claim 1, wherein the operating state is maintained in the first operating state, or switched to the first operating state, if data to be transmitted is not present.

3. The method of claim 1, wherein the operating state is switched to the second operating state in response to the presence of data to be transmitted.

4. The method of claim 3, wherein the presence of data to be transmitted depends on a status of a transmit buffer.

5. The method of claim 1, wherein the received signals are processed by a signal-conditioning unit in the first operating state, and wherein the received signals bypass the signal-conditioning unit in the second operating state.

6. The method of claim 1, wherein the first operating state is maintained for processing the received signals while the processed signals are decoded.

7. The method of claim 1, wherein the first operating state is maintained for processing the received signals while the processed signals are analyzed for channel-load statistics.

8. The method of claim 1, further comprising transmitting, if a result of the CCA indicates a clear channel, the data according to the first RAT in the unlicensed RF spectrum after expiry of a back-off time.

9. The method of claim 8, wherein the data is transmitted according to the first RAT in the unlicensed RF spectrum in a third operating state, wherein no CCA is performed in the unlicensed RF spectrum while in the third operating state.

10. The method of claim 1:
wherein the signals are received and processed by a radio unit coupled to a baseband unit that performs the CCA; and
wherein the method further comprises determining, by the baseband unit, the operating state.

11. The method of claim 1, wherein the method is performed by at least one of a base station for providing a radio access network and a user equipment for accessing a radio access network.

12. A non-transitory computer readable recording medium storing a computer program product for controlling a computing device for performing a clear channel assessment (CCA) in an unlicensed radio frequency (RF) spectrum for transmitting data according to a first radio access technology (RAT) in coexistence with a second RAT, the computer program product comprising software instructions which, when run on processing circuitry of the computing device, causes the computing device to:
receive signals in the unlicensed RF spectrum;
process the received signals according to an operating state, wherein the processing in a first operating state causes a first delay that is greater than a second delay caused by the processing in a second operating state, the operating state depending on the presence of data to be transmitted according to the first RAT in the unlicensed RF spectrum; and
perform the CCA based on the processed signals.

13. A device for performing a clear channel assessment (CCA) in an unlicensed radio frequency (RF) spectrum for transmitting data according to a first radio access technology (RAT) in coexistence with a second RAT, the device comprising:
one or more interfaces;
processing circuitry coupled to the one or more interfaces for signal exchange; and
memory containing instructions executable by the processing circuitry whereby the device is operative to:
receive signals in the unlicensed RF spectrum;
process the received signals according to an operating state, wherein the processing in a first operating state causes a first delay that is greater than a second delay caused by the processing in a second operating state, the operating state depending on the presence of data to be transmitted according to the first RAT in the unlicensed RF spectrum; and
perform the CCA based on the processed signals.

14. The device of claim 13, wherein the operating state is maintained in the first operating state or switched to the first operating state, if data to be transmitted is not present.

15. The device of claim 13, wherein the operating state is switched to the second operating state in response to the presence of data to be transmitted.

16. The device of claim 15, further comprising:
a transmit buffer configured for storing the data to be transmitted,
wherein the presence of data to be transmitted depends on a status of the transmit buffer.

17. The device of claim 13, wherein the received signals are processed by a signal-conditioning unit in the first operating state, and wherein the received signals bypass the signal-conditioning unit in the second operating state.

18. The device of claim 13, wherein the instructions are such that the device is operative to maintain the first operating state for processing the received signals while the processed signals are decoded.

19. The device of claim 13, wherein the instructions are such that the device is operative to maintain the first operating state for processing the received signals while the processed signals are analyzed for channel-load statistics.

20. The device of claim 13, wherein the instructions are such that the device is operative to, if a result of the CCA indicates a clear channel, transmit the data according to the first RAT in the unlicensed RF spectrum after expiry of a back-off time.

21. The device of claim 20, wherein the instructions are such that the device is operative to transmit the data according to the first RAT in the unlicensed RF spectrum in a third operating state, wherein no CCA is performed in the unlicensed RF spectrum while in the third operating state.

22. The device of claim 13, further comprising:
a radio unit configured to receive and process the signals; and
a baseband unit coupled to the radio unit and configured to at least one of:
determine the operating state; and
perform the CCA.

* * * * *